(12) United States Patent
Atefi et al.

(10) Patent No.: US 11,872,904 B2
(45) Date of Patent: Jan. 16, 2024

(54) CONTROL UNIT AND A METHOD FOR HANDLING CHARGING IN AN AT LEAST PARTLY ELECTRIC VEHICLE

(71) Applicant: VOLVO TRUCK CORPORATION, Gothenburg (SE)

(72) Inventors: Reza Atefi, Gothenburg (SE); Henrik Engdahl, Askim (SE); Vahid Pektash, Västra Frölunda (SE); Andreas Melin, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 17/477,086

(22) Filed: Sep. 16, 2021

(65) Prior Publication Data
US 2022/0089057 A1  Mar. 24, 2022

(30) Foreign Application Priority Data
Sep. 18, 2020 (EP) .................................... 20197016

(51) Int. Cl.
| B60L 53/66 | (2019.01) |
| B60L 50/60 | (2019.01) |
| B60L 58/15 | (2019.01) |
| H02J 7/00  | (2006.01) |
| B60L 1/00  | (2006.01) |

(52) U.S. Cl.
CPC ............. *B60L 53/66* (2019.02); *B60L 50/60* (2019.02); *B60L 58/15* (2019.02); *H02J 7/00032* (2020.01); *H02J 7/0048* (2020.01); *B60L 1/00* (2013.01)

(58) Field of Classification Search
CPC .......... B60L 58/15; B60L 53/66; B60L 58/12; B60L 1/003; B60L 50/60; B60L 1/00; H02J 7/00032; H02J 7/0048
See application file for complete search history.

(56) References Cited

U.S. PATENT DOCUMENTS

| 7,755,329 B2 | 7/2010 | Kohn et al. |
| 9,337,680 B2 * | 5/2016 | Gibeau ............... H01M 10/443 |
| 10,744,900 B2 | 8/2020 | Ko et al. |
| 2010/0078993 A1 | 4/2010 | Ichikawa |
| 2017/0217328 A1 * | 8/2017 | Patel ......................... B60K 1/04 |
| 2019/0341608 A1 * | 11/2019 | Xu ..................... H01M 10/0525 |
| 2020/0335994 A1 * | 10/2020 | Shin ........................ H02J 7/0044 |
| 2020/0353797 A1 * | 11/2020 | Zarrabi ................. B60H 1/3232 |
| 2021/0252991 A1 * | 8/2021 | Pizzurro ................. B60L 53/62 |

OTHER PUBLICATIONS

European Search Report dated Feb. 26, 2021 in corresponding European Patent Application No. 20197016.7, 9 pages.

* cited by examiner

*Primary Examiner* — Jared Fureman
*Assistant Examiner* — Esayas G Yeshaw
(74) *Attorney, Agent, or Firm* — Venable LLP; Jeffri A. Kaminski

(57) ABSTRACT

The invention relates to a method performed by a control unit (115) for handling charging in an at least partly electric vehicle (100). The control unit (115) transmits, to a charger (103), a request to provide power to at least one auxiliary load (108) and to charge a battery (101) with an amount of voltage. The amount of voltage corresponds to a desired SOC level. The charging of the battery (101) automatically stops when the desired SOC level is reached. The charger (103) continues to provide power to the at least one auxiliary load (108) when the desired SOC level is reached.

11 Claims, 7 Drawing Sheets

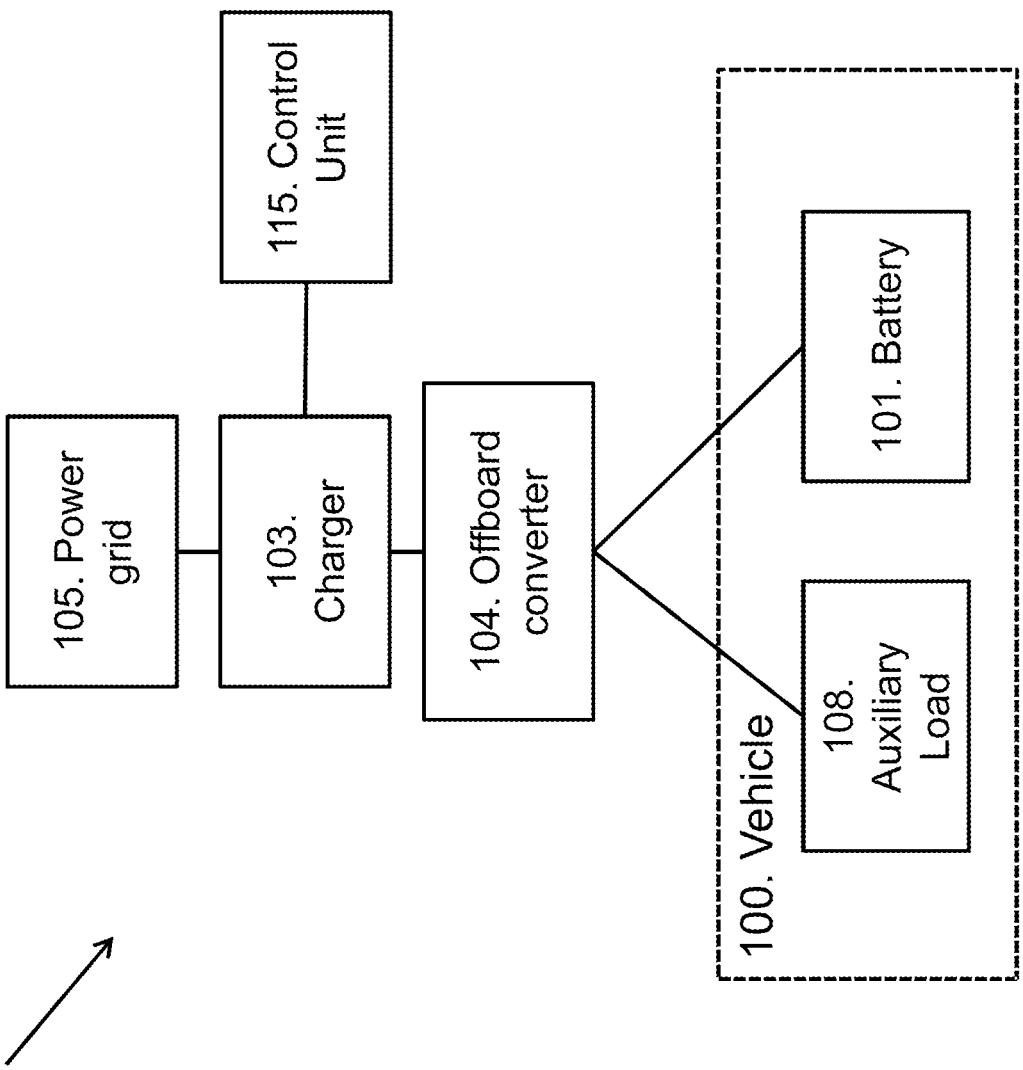

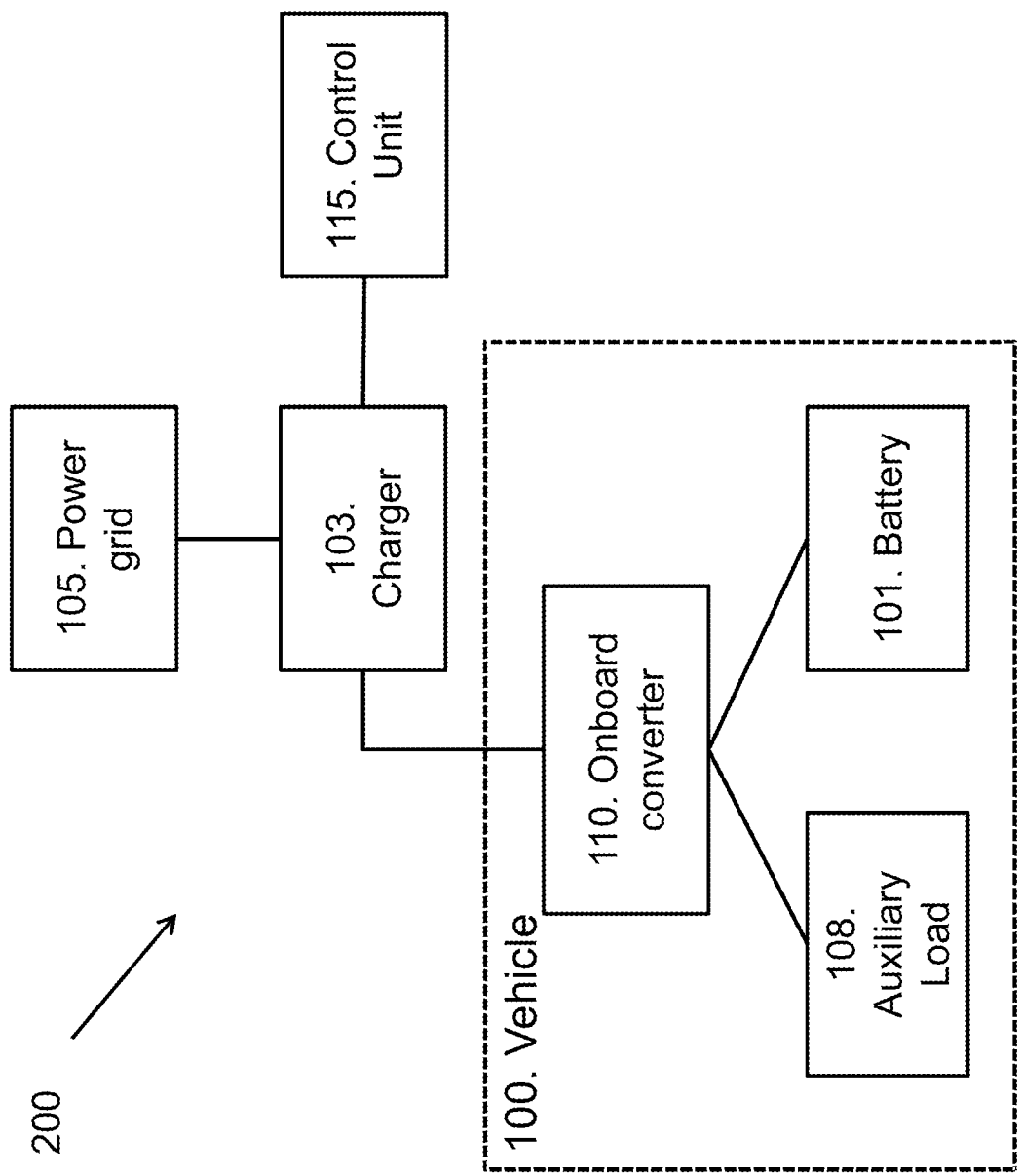

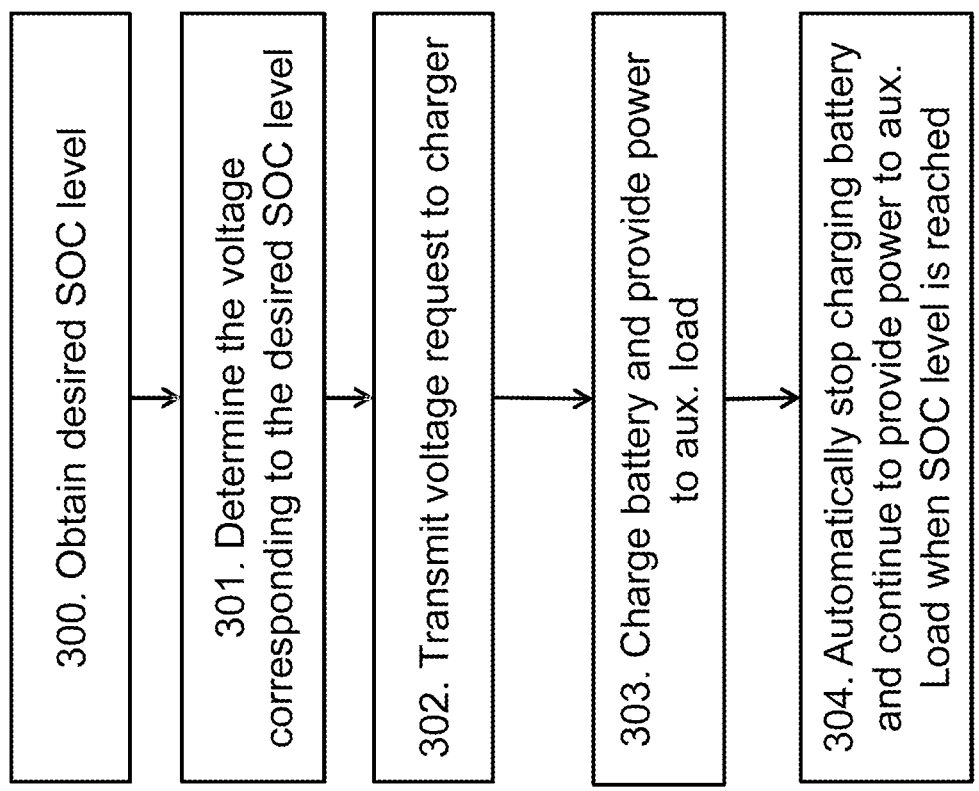

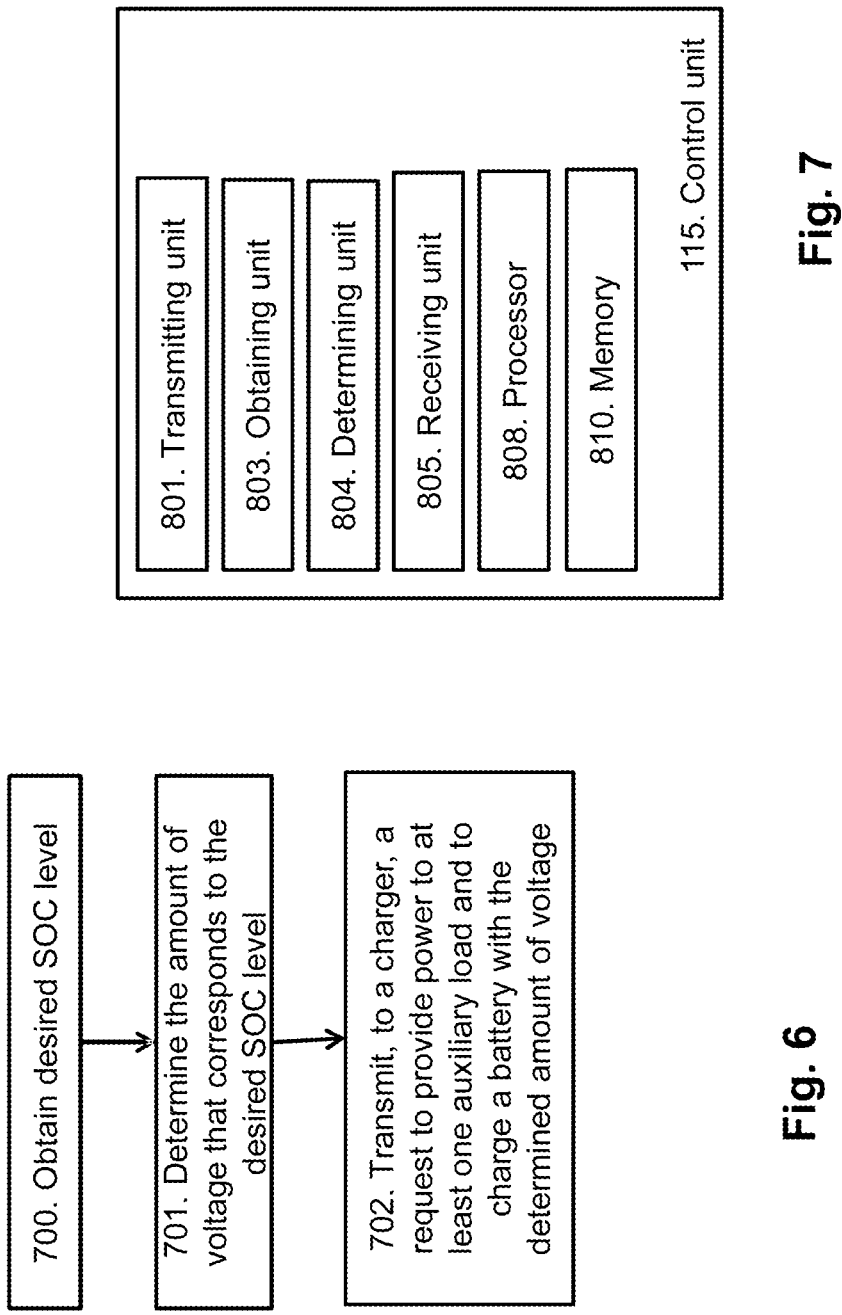

CONTROL UNIT AND A METHOD FOR HANDLING CHARGING IN AN AT LEAST PARTLY ELECTRIC VEHICLE

TECHNICAL FIELD

The invention relates to a control unit, a method performed by the control unit and an at least partly electrical vehicle comprising the control unit. More particularly, the invention relates to handling charging in the at least partly electric vehicle.

The invention can be applied in at least partly electrical heavy-duty vehicles, such as trucks, buses and construction equipment etc. Although the invention will be described with respect to a fully electrified truck, the invention is not restricted to this particular vehicle, but may also be used in other vehicles such as buses, trailers, wheel loaders, articulated haulers, excavators, backhoe loaders, passenger cars, marine vessels etc. It may also be applied in electrical systems of e.g. electrically operated vessels and in various industrial construction machines or working machines. It is applicable in fully electrically operated vehicles as well as in hybrid vehicles, comprising also a combustion engine.

BACKGROUND

An electric machine in an electric vehicle is powered by one or more chargeable batteries. In addition to powering the electric motor, the batteries on board an electric vehicle are today used to power auxiliary loads. These auxiliary loads may be any auxiliary devices such as a heater, a compressor, a pump, a refrigerator, a crane etc. Using the batteries on board the electric vehicle to power the auxiliary loads reduces the lifetime of the batteries since they are often charged and discharged.

Sometimes it may be desirable to only partly charge the batteries, i.e. to charge it to a certain State of Charge (SOC) and then stop charging. If the electric vehicle has certain auxiliary loads that need to be running, e.g. refrigerator to keep food fresh, the energy to run the refrigerator will be taken from the batteries of the electric vehicle.

Once the electric vehicle is connected to a city's power grid, i.e. for charging the batteries, it might be desirable to use the power from the power grid for normal operation of the auxiliary loads instead of the batteries to protect batteries from aging. However, the circuit topology of current electric vehicle does not allow selecting between the batteries and the power grid.

Therefore, there is a need to at least mitigate or solve this issue.

SUMMARY

An object of the invention is to improve charging in an at least partly electric vehicle.

According to a first aspect of the invention, the object is achieved by a method performed by a control unit for handling charging in an at least partly electric vehicle according to claim 1. The control unit transmits, to a charger, a request to provide power to at least one auxiliary load and to charge a battery with an amount of voltage. The amount of voltage corresponds to a desired SOC level. The charging of the battery automatically stops when the desired SOC level is reached. The charger continues to provide power to the at least one auxiliary load when the desired SOC level is reached.

By the provision of a method where the charger continues to provide power to the at least one auxiliary load when the desired SOC level is reached, an advantage is that the lifetime of the battery is increased since it is not used to power the auxiliary load, but only to power the electric motor or machine of the at least partly electric vehicle. An increased lifetime Iso reduces the number of times that the battery needs to be replaced.

Since the charging of the battery automatically stops when the desired SOC level is reached, there is no need for a switch for stopping the charging. Without the need for a switch, the complexity of the at least partly electric vehicle is reduced and also the cost.

Optionally, the charger may be an offboard charger which is located off board the at least partly electric vehicle. With an offboard charger the number of components comprised in the at least partly electric vehicle is reduced, and also its weight and complexity are reduced. An offboard charger may be easy to access in case of the need for repairing or replacing the charger. Repairing and replacing an offboard charger is not limited to the at least partly electric vehicle being connected to it, which makes the charger highly available and easy to inspect.

Optionally, an onboard converter may be located between the charger and the auxiliary load. The onboard converter may be located on board the at least partly electric vehicle. An advantage of the onboard converter is that it removes the need for a converter off board the vehicle. With the onboard converter, current of the correct form is provided to the battery. An onboard converter may be smaller in size compared to an offboard converter.

Optionally, the method may be performed when the at least partly electric vehicle is in a parked mode and connected to a power grid providing power to the charger. Chargers are often mounted for example in or outside a garage, which makes it convenient and easy to charge the battery when the at least partly electric vehicle is in parked mode.

Optionally, the battery is a traction battery adapted to power an electric motor or machine of the at least partly electric vehicle.

Optionally, the battery and the charger may be on a same potential level when the SOC level is reached such that the battery is not further charged. Thereby, an advantage of that charging of the battery is automatically stopped when the SOC level is reached and the battery is not used for powering the at least one auxiliary load.

According to a second aspect of the invention, the object is achieved by a control unit according to claim 9. The control unit is adapted to perform a method as described above. Advantages and effects of the second aspect of the invention are similar to the advantages and effects with respect to the first aspect of the invention. It shall also be noted that all embodiments of the first aspect of the invention are applicable to and combinable with all embodiments of the second aspect of the invention and vice versa.

According to a third aspect of the invention, the object is achieved by an at least partly electric vehicle according to claim 10. The at least partly electric vehicle comprises the control unit described above. Advantages and effects of the third aspect of the invention are similar to the advantages and effects with respect to the first aspect of the invention. It shall also be noted that all embodiments of the first aspect of the invention are applicable to and combinable with all embodiments of the third aspect of the invention and vice versa.

According to a fourth aspect of the invention, the object is achieved by a computer program according to claim 11. The computer program comprises instructions which, when executed on at least one processor, cause the at least one processor to carry out the method according to the first aspect.

According to a fifth aspect of the invention, the object is achieved by carrier. The carrier comprises the computer program of the fourth aspect, wherein the carrier is one of an electronic signal, optical signal, radio signal or computer readable storage medium.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3a is a block diagram illustrating a charging system.
FIG. 3b is a block diagram illustrating a charging system.
FIG. 4 is a flow chart illustrating a method.
FIG. 6 is a flow chart illustrating a method.
FIG. 7 is a block diagram illustrating a control unit.

The drawings are not necessarily to scale and the dimensions of certain features may have been exaggerated for the sake of clarity. Emphasis is instead placed upon illustrating the principle of the embodiments herein.

DETAILED DESCRIPTION OF EXAMPLE EMBODIMENTS OF THE INVENTION

Figure 1:
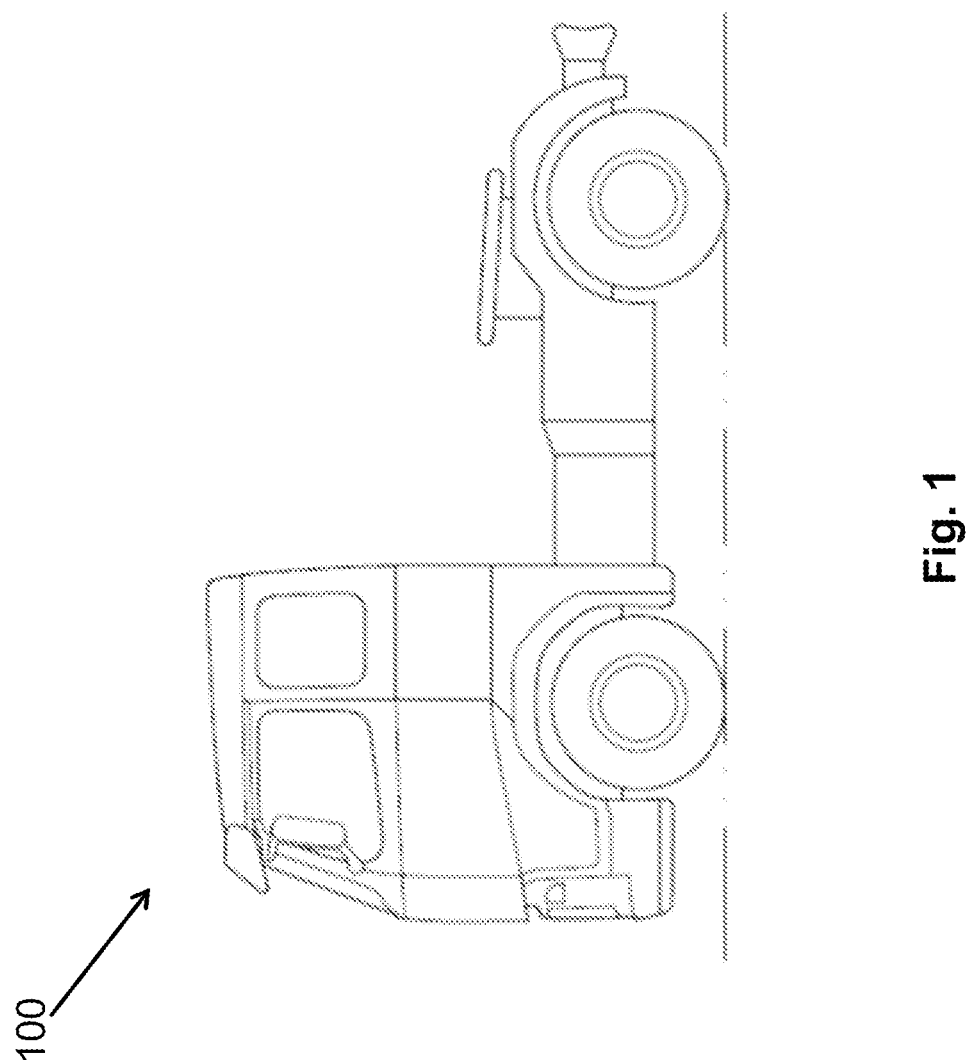
FIG. 1 is a schematic drawing illustrating an at least partly electric vehicle

FIG. 1 illustrates an at least partly electrical vehicle 100. The at least partly electrical vehicle 100 may be fully electrical driven or it may be partly electrical driven vehicle. The term vehicle may be used herein for the sake of simplicity when referring to the at least partly electrical vehicle 100.

The vehicle 100 may be a heavy-duty vehicle, such as a truck, bus, construction equipment, trailer, wheel loader, excavator, passenger car, a marine vessel, an electrically operated vessel, a working machine, stationary backup power solution etc., or any other type of vehicle mentioned herein.

Figure 2:
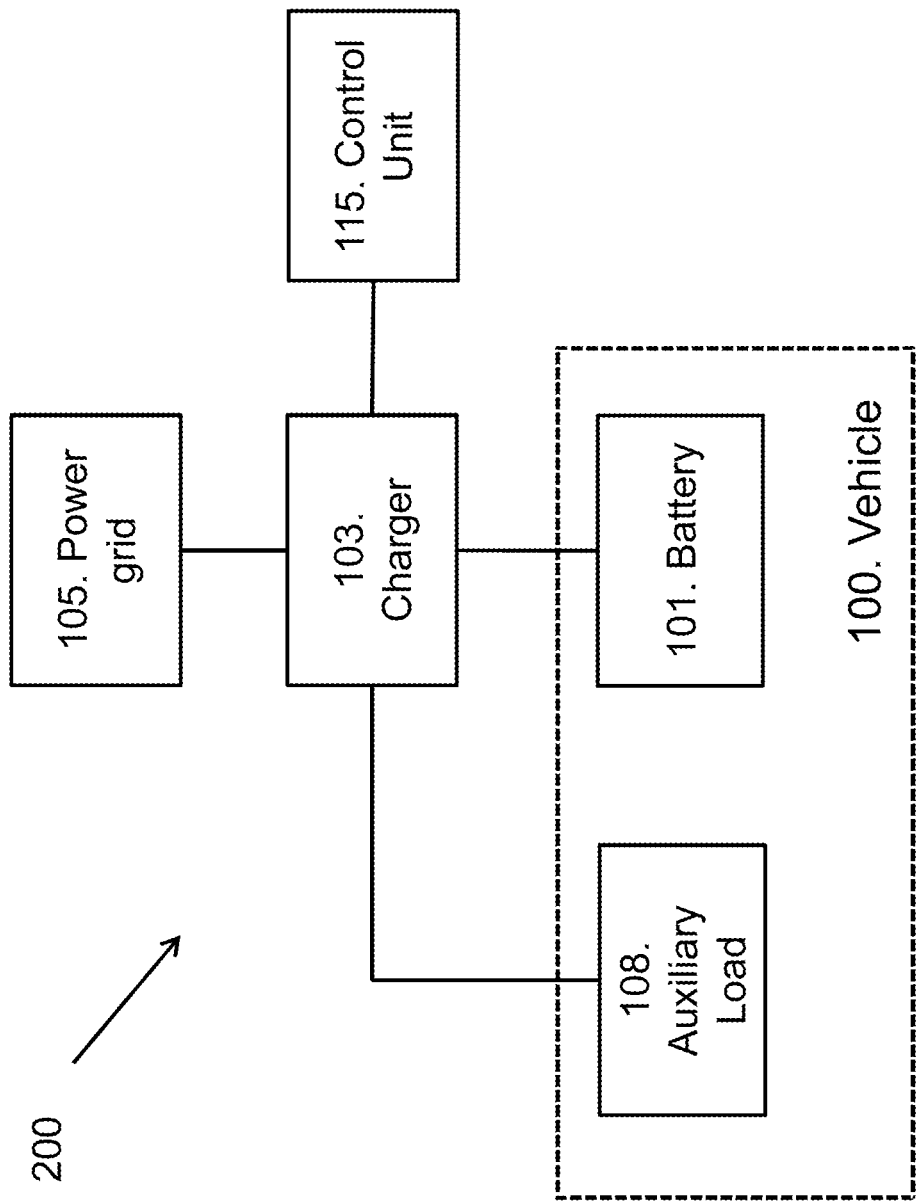
FIG. 2 is a block diagram illustrating a charging system.

FIG. 2 is a schematic block diagram illustrating a charging system 200 for the vehicle 100. The charging system 200 comprises at least one of: at least one battery 101, a charger 103, a power grid 105, at least one auxiliary load 108 and a control unit 115. Some or all units of the charging system 200 illustrated in FIG. 2 may be comprised in or located outside the vehicle 100, they may be associated with or connectable to the vehicle 100. For example, the at least one battery 101 and the auxiliary load 108 may be comprised in the vehicle 100, as illustrated with the dotted box in FIG. 2. The charger 103 may be an offboard charger located externally to the vehicle 100. The power grid 105 is located outside the vehicle 100. The control unit 115 may be comprised in or located outside the vehicle 100, for example located at the same place as the charger 103.

The vehicle 100 comprises at least one battery 101. There may be one, two or more batteries 101. The term battery may be used herein for the sake of simplicity when referring to any number of batteries comprised in the vehicle 100. The battery 101 may be adapted to power an electric motor or machine comprised in the vehicle 100. The battery 101 is a rechargeable battery. The battery 101 may be referred so as an electric battery. The battery 101 may comprise one or more battery cells (not shown). The battery 101, also referred to as a traction battery, may be of any suitable type such for example lithium-ion battery, lithium polymer battery, fuel-cell battery, lead-acid battery, nickel metal hydride battery etc. The battery 101 may generate current in Direct Current (DC) form and needs DC current to be charged.

The battery 101 is adapted to be charged by means of the charger 103. The charger 103 may be an offboard charger located off board the vehicle 100. The charger 103 may be located for example in a garage where the vehicle 100 may be parked. The charger 103 is adapted to be connected to the battery 101. The charger 103 may be any suitable type of charger adapted to charge the battery 101 comprised in the vehicle 100. The charger 103 may communicate, e.g. wirelessly or via wire, with the vehicle 100 in order to supply the battery 101 with the correct voltage and current.

The charger 103 may be adapted to be connected to and to receive electric power from a power grid 105. The power grid 105 is adapted to provide electric power to the charger 103. The power grid 105 may be referred to as an electric grid, a net grid etc. The power grid 105 is external to the vehicle 100. The power grid 105 may provide current in Alternating Current (AC) form.

An offboard converter 104 may be located between, e.g. electrically located between, the charger 103 and the battery 101, as illustrated in FIG. 3a. The offboard converter 104 may be an optional unit. The offboard converter 104 may be located off board the vehicle 100, e.g. illustrated as being outside the dotted box in FIG. 3a. The offboard converter 104 may be a Charging Switch Unit (CSU). The offboard converter 104 may be adapted to convert AC from the power grid 105 to DC to be provided to the battery 101. The battery 101 is charged with DC, but the power grid 105 provides AC. Thus, it is necessary to convert the AC from the power grid 105 to DC to be able to charge the battery 101. If the conversion is performed outside the vehicle 100, i.e. by the offboard converter 104, then larger systems with high power may be built, and higher DC current levels like 60A may be generated to charge the battery 101 comprised in the vehicle 100 faster and that is when the offboard converter 104 may be needed for the sake of safety.

Instead of or in addition to the offboard converter 104, the vehicle 100 may comprise an onboard converter 110, as illustrated in FIG. 3b. The onboard converter 110 may be an optional unit. The onboard converter 110 may be located on board the vehicle 100, as indicated as being located inside the dotted box in FIG. 3b. The onboard converter 110 may be located between, e.g. electrically located between, the auxiliary load 108 and the charger 103 such that the power provided from the charger 103 may go via the onboard converter 110 before reaching the auxiliary load 108 and the battery 101 in converted form. The onboard converter 110 may be referred to as a bidirectional switch or an onboard charger. The onboard converter 110 may be an onboard charger, it may be comprised in an onboard charger or it may be function of the onboard charger. The onboard converter 110 may be adapted to convert AC to DC or vice versa. The onboard converter 110 may comprise one or multiple outputs, and these one or multiple outputs may be AC output, DC output or both. The onboard converter 110 may convert the AC from the power grid 105 to the DC used for charging the battery 101 or to provide DC to the auxiliary load 108 which runs on DC. Alternatively it may convert the DC from the battery 101 to an AC for an auxiliary load 108 that operates on AC, like an AC fridge.

If the offboard converter 104 is not comprised in the charging system 200 or is not accessible for some reason, as mentioned earlier, there may be an onboard converter 110 comprised in the vehicle 100 which may perform the conversion from AC to DC. However, since the space inside the vehicle 100 may be limited, the onboard converter 110 may be small and requires low power, and the DC that it may generate is not that strong, e.g. 13A, to require an offboard converter 104 for safety.

Now returning to FIG. 2. The vehicle 100 comprises or is adapted to be connected to at least one auxiliary load 108. There may be one, two or more auxiliary loads 108 comprised in the vehicle 100. The term auxiliary load may be used herein for the sake of simplicity when referring to any number of auxiliary loads 108 comprised in or connectable to the vehicle 100. The auxiliary load 108 may be any auxiliary device such as a heater, a compressor, a pump, a refrigerator, a crane etc. The auxiliary load 108 is adapted to receive power from the charger 103. The auxiliary load 108 is not powered by the battery 101, but by the charger 103. The auxiliary load 108 may run on DC or AC.

A control unit 115 may be adapted to control, monitor or control and monitor charging of the battery 101, provision of power to the auxiliary load 108 etc. The control unit 115 may be partly or completely comprised in the vehicle 100. The control unit 115 may be external to and adapted to be connected to the vehicle 100, e.g. located together with the charger 103 in a garage where the vehicle 100 may be parked. The control unit 115 may be in the form of any suitable computer processor. The control unit 115 may or may not have a user interface on which a user or an operator may monitor and interact the charging of the battery 101, e.g. by inputting a desired SOC level, by starting and stopping the charging etc. The control unit 115 may facilitate communication between the charger 103 and the vehicle 100 in order for the charger 103 to supply the battery 101 with the desired voltage and current.

The method for handling charging in the at least partly electric vehicle 100 will now be described with reference to the flow chart in FIG. 4. The method may be performed when the vehicle 100 is in parked mode, i.e. when it stands still and is connected to the charger 103. The method comprises at least one of the following steps, which steps may be performed in any suitable order than described below:

Step 300

Figure 5:
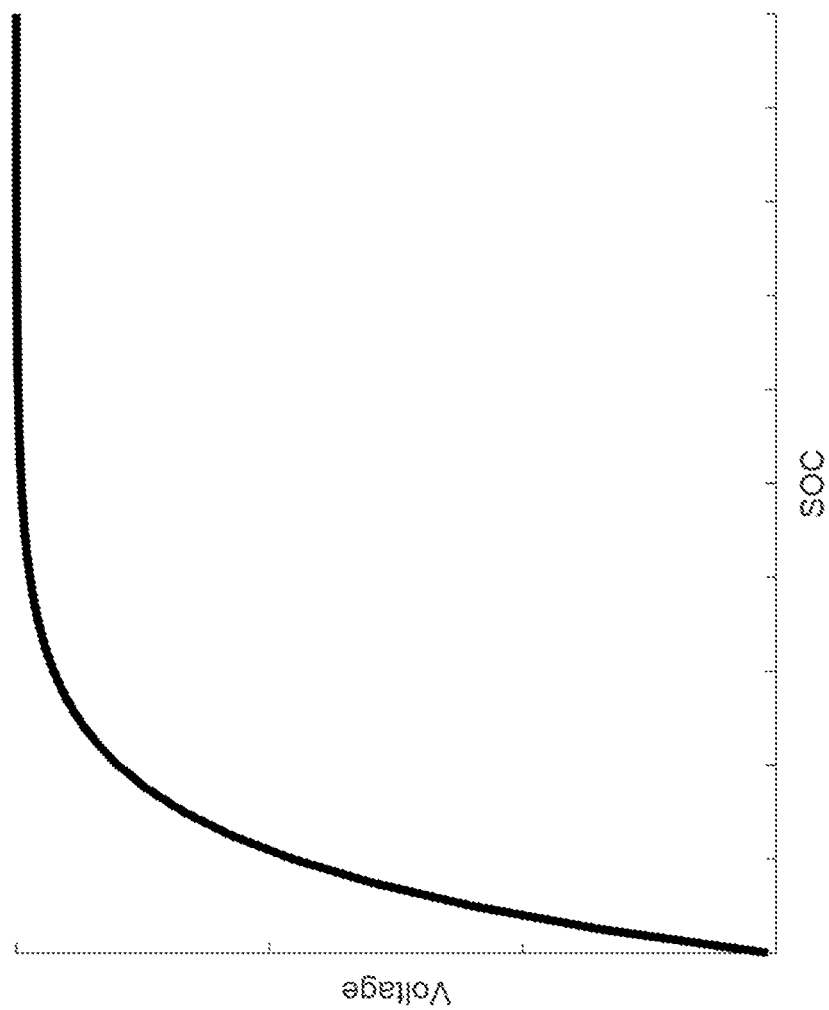
FIG. 5 is a graph illustrating voltage and SOC.

A desired SOC level that the battery 101 should be charged to may be obtained. The desired SOC level may be obtained by being set by the control unit 115 or by an operator inputting the desired SOC level to the control unit 115 via e.g. a user interface comprised in or associated with the control unit 115. The control unit 115 may set the desired SOC level based on information about the battery's 101 capacity, based on other information, based on an analysis of parts or the whole charging system 200 performed by the control unit 115 etc. The SOC level corresponds to a certain voltage level. The voltage of the battery 101 is a function of the SOC, as seen in FIG. 5. The x-axis of FIG. 5 represents the SOC level and the y-axis of FIG. 5 represents the voltage. Hence it is possible to set the max SOC level in such a way that the battery 101 will have the same potential as the charger 103. With this, no current will flow to the battery 101 from the charger 103 since they are at the same potential level.

The SOC may be described as the level of charge of the battery 101 relative to its capacity. An empty or fully discharged battery 101 may have an SOC of 0 or 0%. A fully charged battery 101 may have an SOC of 1 or 100%.

Step 301

The voltage corresponding to the desired SOC level is determined, e.g. by the control unit 115. The SOC level may be determined by performing calculations, by means of a table look-up etc.

Step 302

The control unit 115 transmits a request to the charger 103 to provide power to the at least one auxiliary load 108 and to charge the battery 101 with the amount of voltage determined in step 301. For example, if a voltage level of 700V in the battery 101 is determined in step 301 as corresponding to 100% SOC level, the charger 103 will be requested to provide 700V. Note that 700V is an example that that the voltage level may be other values depending on the battery type and its requirements, e.g. 500V, 400V, 300V etc.

Step 303

Upon receiving the request, the charger 103 starts charging the battery 101 and powers the at least one auxiliary load 108 at the same time.

There may be a conversion from AC to DC of the power before reaching the battery 101 and the at least one auxiliary load 108. The conversion may be done by the offboard converter 104 or the onboard converter 110, or both.

Until the desired SOC level is reached, the charger 103 continues to charge the battery 101 and to provide power to the auxiliary load 108. The voltage level of the auxiliary load 108 may be lower than the SOC level or it may be the same as the SOC level. The voltage level of the auxiliary load 108 may depend on the vehicle configuration and the type of the auxiliary load 108.

Step 304

Once the battery 101 reaches the desired SOC level, i.e. the same voltage as the charger 103, the charger 103 will not be able to transfer any currents to the battery 101. Hence the charging of the battery 101 automatically stops while the charger 103 continues to power the auxiliary load 108.

One way of making sure that the charger 103 stops charging the battery 101 may be to add a switch that opens and therefore prohibit current from the charger 103 to the battery 101. This would however add complexity to the charging system 200 and the vehicle 100 and would be more costly. Instead, the SOC level of the batteries is used, as in the present invention. A certain SOC level corresponds to a certain voltage of the battery 101. Once the battery 101 reaches the same voltage as the charger 103 provides, no current will flow, hence the charging of the battery 101 will automatically stop. The auxiliary load 108 will however continue to be powered by the power grid 105 via the charger 103.

The method for handling charging in an at least partly electric vehicle 100 described above will now be described seen from the perspective of the control unit 115 and illustrated in FIG. 6. The method may be performed when the at least partly electric vehicle 100 is in a parked mode and connected to a power grid 105 providing power to the charger 103. The method seen in FIG. 6 comprises at least one of the following steps, which steps may be performed in any suitable order than described below:

Step 700

This step corresponds to step 300 in FIG. 3. The control unit 115 may obtain a desired SOC level. The desired SOC level may be obtained from a user interface or obtained by being determined or set by the control unit 115.

Step 701

This step corresponds to step 301 in FIG. 3. The control unit 115 may determine the amount of voltage that corresponds to the desired SOC level.

Step 703

This step corresponds to steps 302-304 in FIG. 4. The control unit 115 transmits, to a charger 103, a request to provide power to the least one auxiliary load 108 and to charge the battery 101 with the amount of voltage. The amount of voltage corresponds to the desired SOC level.

The charger 103 may be an offboard power supply which is located off board the at least partly electric vehicle 100.

The battery 101 may be a traction battery adapted to power an electric motor of the at least partly electric vehicle 100.

Once the battery 101 has reached the desired SOC level, the charging of the battery 101 automatically stops. The charger 103 continues to provide power to the at least one auxiliary load 108 when the desired SOC level is reached.

The battery 101 and the charger 103 may be on a same potential level when the SOC level is reached such that the battery 101 is not further charged.

An onboard converter 110 may be located between the charger 103 and the auxiliary load 108, and the onboard converter 110 may be located on board the at least partly electric vehicle 100.

The control unit 115 is adapted to perform the method described herein. To perform the method steps shown in FIG. 6 for handling charging in an at least partly electric vehicle 100 the control unit 115 may comprise an arrangement as shown in FIG. 7. The control unit 115 may be adapted to perform the method when the at least partly electric vehicle 100 is in a parked mode and connected to a power grid 105 providing power to the charger 103.

The control unit 115 is adapted to, e.g. by means of a transmitting unit 801, transmit, to a charger 103, a request to provide power to at least one auxiliary load 108 and to charge a battery 101 with an amount of voltage, The amount of voltage corresponds to a desired SOC level. The transmitting unit 801 may also be referred to as a transmitting module, a transmitting means, a transmitting circuit, means for transmitting, output unit etc. The transmitting unit 801 may be a transmitter, a transceiver etc. The transmitting unit 801 may be a wireless or wired transmitter of the control unit 115.

The control unit 115 may be adapted to, e.g. by means of an obtaining unit 803, obtain the desired SOC level. The desired SOC level may be obtained from a user interface or obtained by being determined or set by the control unit 115. The obtaining unit 803 may also be referred to as an obtaining module, an obtaining means, an obtaining circuit, means for obtaining etc. The obtaining unit 803 may be a processor 808 of the control unit 115 or comprised in the processor 808 of the control unit 115.

The control unit 115 may be adapted to, e.g. by means of a determining unit 804, determine the amount of voltage that corresponds to the desired SOC level. The determining unit 804 may also be referred to as a determining module, a determining means, a determining circuit, means for determining etc. The determining unit 804 may be the processor 808 of the control unit 115 or comprised in the processor 808 of the control unit 115.

The control unit 115 may comprise a receiving unit 805, adapted to receive input from an operator via a user interface, from the charger 103, the at least partly electric vehicle 100 etc. The receiving unit 805 may also be referred to as a receiving module, a receiving means, a receiving circuit, means for receiving, input unit etc. The receiving unit 805 may be a receiver, a transceiver etc. The receiving unit 805 may be a wireless or wired receiver of the control unit 115. The receiving unit 804 may be the same as the obtaining unit 803.

The charging of the battery 101 automatically stops when the desired SOC level is reached. The charger 103 continues to provide power to the at least one auxiliary load 108 when the desired SOC level is reached.

The charger 103 may be an offboard power supply which is located off board the at least partly electric vehicle 100.

An onboard converter 110 may be located between the charger 103 and the auxiliary load 108, and the onboard converter 110 may be located onboard the at least partly electric vehicle 100.

The battery 101 may be a traction battery adapted to power an electric motor of the at least partly electric vehicle 100.

The battery 101 and the charger 103 may be on a same potential level when the SOC level is reached such that the battery 101 is not further charged.

The control unit 115 may comprises the processor 808 and a memory 810. The memory 810 comprises instructions executable by the processor 808.

A computer program may comprise instructions which, when executed on at least one processor, cause the at least one processor to carry out the method described herein. A carrier may comprise the computer program, and the carrier may be one of an electronic signal, optical signal, radio signal or computer readable storage medium.

The method described herein handling charging in an at least partly electric vehicle 100 may be implemented through one or more processors, such as the processor 808 in the control unit 115 illustrated in FIG. 7, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the control unit 115. One such carrier may be in the form of a CD ROM disc. It is however feasible with other data carriers such as a memory stick. The computer program code can furthermore be provided as pure program code on a server and downloaded to the control unit 115.

Summarized, once the vehicle 100 is connected to the charger 103 and consequently also the power grid 105, the auxiliary load 108 receives power from the power gird 105 rather than from the battery 101 to prevent overusing the battery 101 and reducing its lifecycle. Hence, once the battery 101 is fully charged, it automatically stops receiving current from the charger 103 and the power grid 105, and the auxiliary load 108 continues to receive power from the charger 103 and the power grid 105. The charger 103 powers both the auxiliary load 108 and charges the battery 101 at the same time, it is performed in parallel until the battery 101 is charged to the desired SOC level and the charging of the battery 101 is automatically stopped. The auxiliary load 108 is kept powered by the charger 103 after the battery 101 is fully charged. This allows a software based solution without the need for extra hardware.

The control unit 115 sends a voltage request to the charger 103 in order to supply a certain voltage. When the battery 101 reaches the set or determined SOC level, the charger 103 will automatically stop providing current to the battery 101 since the charger 103 and the battery 101 are on the same voltage level. However, the charger 103 continues to power the auxiliary load 108, hence the lifetime of the battery 101 is saved since there is no need to use the battery 101 to power the auxiliary load 108.

Based on the desired SOC level, it is possible to set the battery's potential to be on the same potential level as the charger 103 and the power grid 105. Hence, no current from the charger 103 will flow to the battery 101 when the desired SOC level is reached. Instead the current from the charger 103 will be supplied to the other loads such as the auxiliary load 108.

The method described herein may be implemented as a software-based control method within the charging system 200 of the at least partly electric vehicle 100. The method allows to automatically stop current to be provided from the charger 103 and the power grid 105 to the battery 101 once it is fully charged, i.e. when the desired SOC level is reached, and still provide power to the auxiliary load 108 from the charger 103 and the power gird 105. Since the method may be software-based, it's not limited to any specific charging system architecture. Instead it may be used on various architectures.

The term "at least one of A and B" should be understood to mean "only A, only B, or both A and B.", where A and B are any parameter, number, indication used herein etc.

The term "adapted to" used herein may also be referred to as "arranged to", "configured to", "capable of" or "operative to".

It is to be understood that the present invention is not limited to the embodiments described herein and illustrated in the drawings; rather, the skilled person will recognize that many changes and modifications may be made within the scope of the appended claims.

The invention claimed is:

1. A method performed by a control unit for handling charging in an at least partly electric vehicle, the method comprising: transmitting to a charger, a request to provide power to at least one auxiliary load and to charge a battery with an amount of voltage, receiving electric power at the charger from the power grid, wherein the amount of voltage corresponds to a desired State of Charge, SOC, level; wherein the charging of the battery automatically stops when the desired SOC level is reached, and wherein the charger continues to provide the electric power to the at least one auxiliary load when the desired SOC level is reached.

2. The method according to claim 1, comprising: obtaining the desired SOC level; and determining the amount of voltage that corresponds to the desired SOC level.

3. The method according to claim 2, wherein the desired SOC level is obtained from a user interface or obtained by being determined by the control unit.

4. The method according to claim 1, wherein the charger is an offboard power supply which is located off board the at least partly electric vehicle.

5. The method according to claim 1, wherein an onboard converter is located between the charger and the auxiliary load, and wherein the onboard converter is located on board the at least partly electric vehicle.

6. The method according to claim 1, wherein the method is performed when the at least partly electric vehicle is in a parked mode and connected to a power grid providing power to the charger.

7. The method according to claim 1, wherein the battery is a traction battery adapted to power an electric motor of the at least partly electric vehicle.

8. The method according to claim 1, wherein the battery and the charger is on a same potential level when the SOC level is reached such that the battery is not further charged.

9. A control unit adapted to perform a method according to claim 1.

10. An at least partly electric vehicle comprising the control unit according to claim 9.

11. A non-transitory computer readable medium storing computer program code comprising instructions which, when executed on at least one processor, cause the at least one processor to carry out the method according to claim 1.

* * * * *